UNITED STATES PATENT OFFICE.

OSWALD SCHMIEDEBERG, OF STRASSBURG, GERMANY, ASSIGNOR TO C. F. BOEHRINGER & SOEHNE, OF WALDHOF, GERMANY.

PROCESS OF OBTAINING IRON DERIVATIVES OF ALBUMEN.

SPECIFICATION forming part of Letters Patent No. 566,280, dated August 18, 1896.

Application filed October 14, 1893. Serial No. 488,165. (Specimens.) Patented in England September 4, 1893, No. 16,589; in France September 14, 1893, No. 232,805; in Belgium September 18, 1893, No. 106,401, and in Italy September 25, 1893, XXVIII, 34,875, and LXX, 432.

*To all whom it may concern:*

Be it known that I, OSWALD SCHMIEDEBERG, a citizen of the Empire of Germany, residing at Strassburg, in Alsace, in the Empire of Germany, have invented certain new and useful Improvements in the Method of Obtaining Iron Derivatives of Albumen, (for which I have obtained patents in Great Britain, No. 16,589, dated September 4, 1893; in France, No. 232,805, dated September 14, 1893; in Belgium, No. 106,401, dated September 18, 1893, and in Italy, Registro General, Vol. 28, No. 34,875, Registro Attestati, Vol. 70, No. 432, dated September 25, 1893;) and I do hereby declare the following to be a full, clear, and exact description of the invention, such as will enable others skilled in the art to which it appertains to make and use the same.

The present invention relates to the art of obtaining iron derivatives of albumen, which may be readily assimilated by the animal or human organism; and its object is to utilize for this purpose such organs of the animal body in which it has been demonstrated that these iron derivatives exist already formed.

In the patent of Pio Marfori and myself, dated October 3, 1893, No. 505,986, and in my application, dated October 14, 1893, Serial No. 488,164, methods are described for obtaining iron derivatives of albumen of a similar composition and similar characteristics artificially. The present method is distinguished from these by the fact that by virtue of the same the natural product already existing is extracted directly and isolated from parts of the animal body.

Several internal organs of the animal body, such as the liver, the spleen, and the kidneys, contain an iron derivative of albumen in which the iron is bound in such a manner that the iron in a solution of the same cannot be detected directly by the ordinary reagents and tests for iron. This derivative is formed in greatest quantity in the liver, and this organ is hence used by preference in carrying out my process, which consists, essentially, in extracting the derivative from animal organs by heating the same with water and precipitating the same from the solution thus formed, and, furthermore, in such features and combinations of steps as will be hereinafter set forth, and pointed out in the claims.

In carrying out my invention I preferably proceed as follows: I finely chop or otherwise comminute the liver and add thereto five times its volume of distilled water, while stirring. This mixture is then placed on the water-bath and gradually heated, within a period of two hours, while stirring, to 95° centigrade, *i. e.*, until coagulation of the albuminous substances commences.

By gradually heating a complete extraction of the comminuted liver is accomplished before coagulation takes place. This coagulating stage is recognized by the appearance of a turbid bloody liquid between the solid parts. When such coagulation has commenced, the mass is further heated up to the boiling-point and there maintained for from five to eight minutes, until the last trace of blood has coagulated and the liquid has become clear. This boiling must not be continued longer than just necessary to complete coagulation, so that no formation of glue takes place. The mass is then filtered to remove the coagulum, and washed on the filter with boiling water. The filtrate so obtained, which is a brownish-yellow liquid which reacts slightly acid, is allowed to cool off completely. I thereupon carefully add a dilute solution of a suitable acid, such as tartaric acid, to the cooled filtrate until the resulting precipitate shows a distinct coloration. The resulting brownish-yellow precipitate soon assumes a flaky consistency and settles at the bottom of the containing vessel. The supernatant turbid liquid is then decanted off or otherwise removed, and the precipitate is collected upon the filter and washed with distilled water until acid reaction completely disappears. The washed precipitate is dried at a moderately-raised temperature, preferably *in vacuo*, and then powdered.

The iron derivative of albumen so obtained, which may be used as a medicine or a food, is a tasteless and odorless powder of reddish-brown color, insoluble in water, alcohol, and dilute acids. In weak alkaline liquids it is readily soluble, the solution being of a reddish-brown color. A neutral solution of the same will not coagulate on boiling. It contains about seven per cent. of iron, which is bound in the molecule in a manner which differs essentially from that in which the iron is bound in iron salts.

If, therefore, twenty cubic centimeters of a solution of the iron-albumen derivative, prepared by boiling the same, containing 0.06 grams of the derivative, are treated in the cold with one drop of a solution of sulfid of ammonium, containing fifty per cent. of sulfid of ammonium, (Fresenius, "*Qualitative Analyse*," 14th edition, page 68,) the solution will not lose its yellow color within three minutes.

As already indicated, the process hereinbefore set forth may be modified in various particulars without departing from the essence of my invention. Thus, for example, other internal organs of the animal body than the liver may be employed, such as the spleen or the kidneys. Other acids than tartaric acid may also be employed for precipitating the iron-albumen derivative.

What I claim, and desire to secure by Letters Patent, is—

1. The process of obtaining an iron derivative of albumen, which consists in adding water to internal animal organs and gradually heating the same to the boiling-point, then separating the coagulum and then treating the extract so obtained with dilute acid, substantially as set forth.

2. The process of obtaining an iron derivative of albumen, which consists in making an extract from liver or other animal organ, by slowly heating the same with water to the boiling-point, removing the coagulum produced and cooling, and finally treating the extract with acid, to precipitate the iron-albumen derivative.

3. The process of obtaining an iron derivative of albumen, which consists in making an extract from liver or other organs, by slowly heating the same with water nearly up to the boiling-point, then raising the temperature to the boiling-point and maintaining the extract at the boiling-point for a short time, then filtering, then cooling off completely, and finally treating the filtrate with an acid solution in order to precipitate the iron-albumen derivative.

4. The process of obtaining an iron derivative of albumen, which consists in adding water to finely-comminuted internal animal organs, such as liver, gradually heating the mixture, while stirring, to near the boiling-point until the albuminous substances begin to coagulate, then raising the temperature to, and maintaining it at, the boiling-point until the coagulation is completed, then filtering, and, finally, treating the filtrate with a dilute acid solution to precipitate the iron-albumen derivative, substantially as set forth.

5. The process of obtaining an iron derivative of albumen, which consists in adding, to finely-comminuted liver, five times its bulk of water, then gradually heating the mixture to near the boiling-point until coagulation of the albuminous substances begins, then raising the temperature to the boiling-point and maintaining it there until coagulation is completed, then filtering and allowing the filtrate to cool, and, finally, treating the filtrate with dilute tartaric acid, to precipitate the iron derivative, substantially as set forth.

6. The process of obtaining an iron derivative of albumen, which consists in adding water to comminuted liver and gradually heating the same to the boiling-point, then separating the coagulum, and finally treating the extract so obtained with tartaric acid, substantially as set forth.

7. The process of obtaining an iron derivative of albumen, which consists in adding water to comminuted liver and gradually heating the same to the boiling-point, then separating the coagulum, and finally treating the extract so obtained with dilute tartaric acid, substantially as set forth.

8. The process of obtaining an iron derivative of albumen, which consists in adding water to finely-comminuted internal animal organs, such as liver, gradually heating the mixture, while stirring, to near the boiling-point until the albuminous substances begin to coagulate, then raising the temperature to, and maintaining it at, the boiling-point until the coagulation is completed, then filtering, and finally treating the filtrate with a dilute tartaric-acid solution to precipitate the iron-albumen derivative, substantially as set forth.

In testimony whereof I affix my signature in presence of two witnesses.

OSWALD SCHMIEDEBERG.

Witnesses:
W. HAUPT,
L. A. EDWARLT.